United States Patent [19]

Howerton

[11] Patent Number: 4,533,040
[45] Date of Patent: * Aug. 6, 1985

[54] BELT CONSTRUCTION AND METHOD OF MAKING THE SAME

[75] Inventor: Anderson W. Howerton, Christian County, Mo.

[73] Assignee: Dayco Corporation, Dayton, Ohio

[*] Notice: The portion of the term of this patent subsequent to Sep. 11, 2001 has been disclaimed.

[21] Appl. No.: 621,967

[22] Filed: Jun. 18, 1984

Related U.S. Application Data

[60] Division of Ser. No. 530,568, Sep. 9, 1983, , which is a continuation-in-part of Ser. No. 315,840, Oct. 28, 1981, abandoned.

[51] Int. Cl.³ .............................................. B65G 15/34
[52] U.S. Cl. ..................................................... 198/847
[58] Field of Search ................. 198/847, 846; 474/238, 474/252; 156/137–139, 436

[56] References Cited

U.S. PATENT DOCUMENTS

| 1,855,808 | 4/1932 | Schwan | 198/847 |
| 2,263,960 | 11/1941 | Wilson | 474/238 |
| 3,290,195 | 12/1966 | Davis | 156/139 |
| 3,838,605 | 10/1974 | Müller | 474/238 |
| 3,900,627 | 8/1975 | Angioletti et al. | 198/847 |
| 4,140,485 | 2/1979 | Silverman | 198/847 |

OTHER PUBLICATIONS

Sparks Conveyor & Elevator Belting, 1970 Catalog, p. 12.

Primary Examiner—Joseph E. Valenza
Assistant Examiner—Kyle E. Shane
Attorney, Agent, or Firm—Joseph V. Tassone

[57] ABSTRACT

A belt construction comprising a tension section, a compression section, a load-carrying section intermediate the tension section and the compression section, and a load-supporting top section secured to the tension section and extending beyond opposed sides of the tension section, the top section and the tension section being formed of the same material and being homogeneously secured together. A fabric covering covers the exterior of the tension, compression and load-carrying sections and is substantially U-shaped in cross section with the free ends of the legs thereof being embedded in the top section. The top section has opposed surfaces one of which has an intermediate portion thereof secured to the tension section and the other of which provides a load supporting surface for the belt construction, the top section having a tire cord reinforcing member disposed intermediate the opposed surfaces thereof.

12 Claims, 5 Drawing Figures

U.S. Patent  Aug. 6, 1985  4,533,040
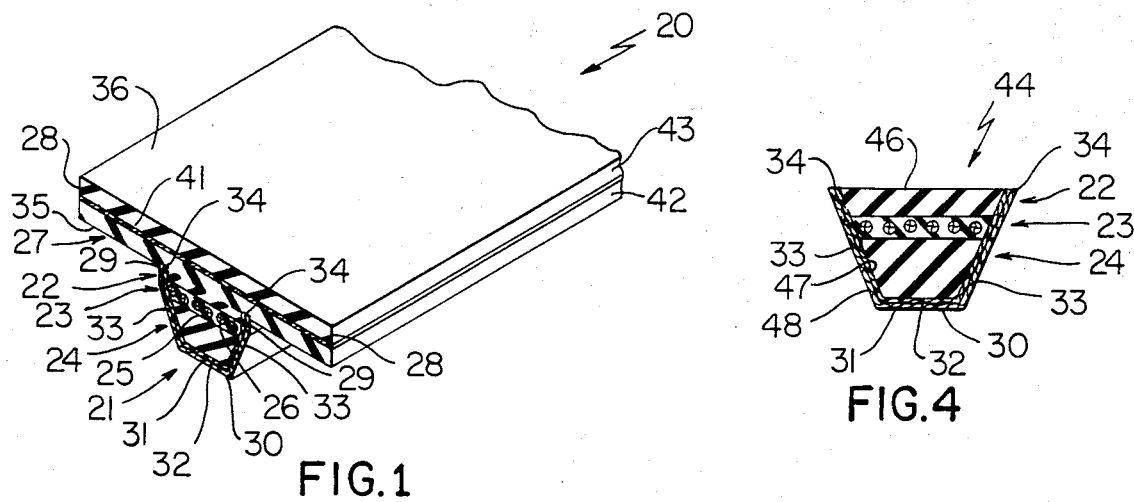
FIG.1
FIG.4
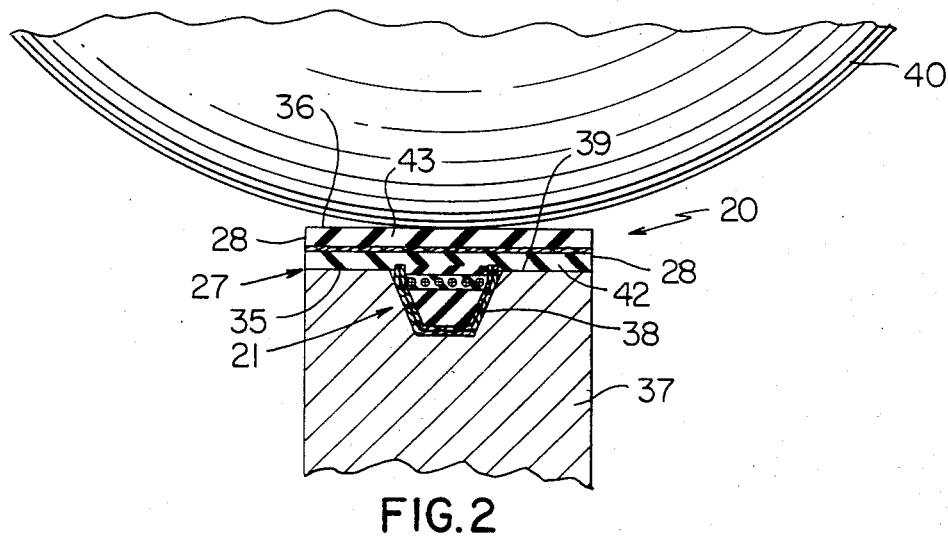
FIG.2
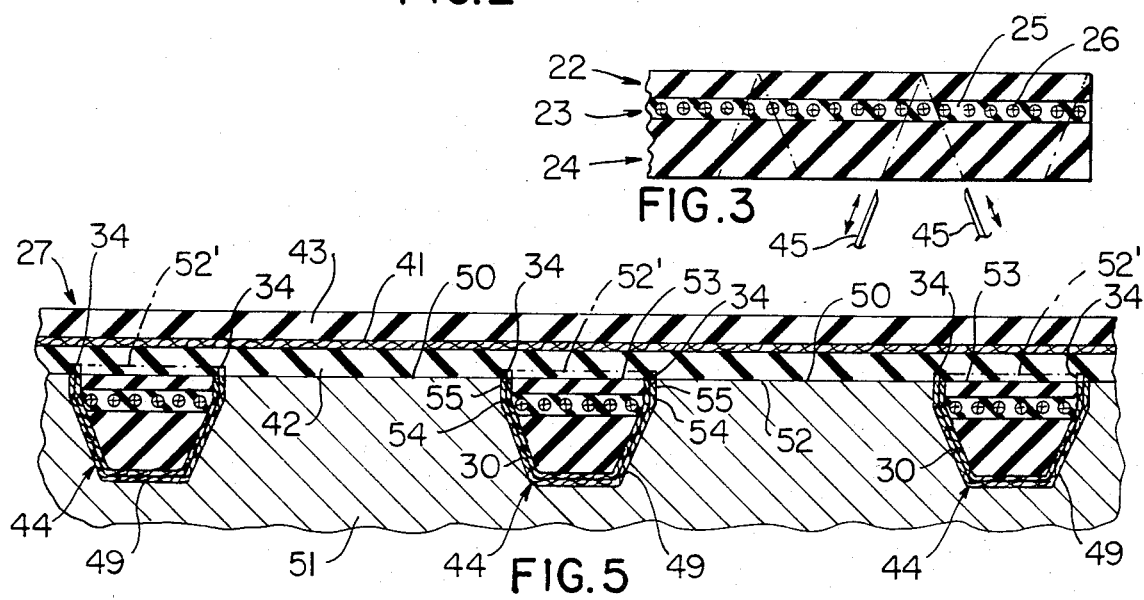
FIG.3
FIG.5

BELT CONSTRUCTION AND METHOD OF MAKING THE SAME

This is a division of application Ser. No. 530,568, filed Sept. 9, 1983, now U.S. Pat. No. 4,470,500, issued Sept. 11, 1984, which was a continuation of Ser. No. 315,840, filed Oct. 28, 1981, now abandoned.

BACKGROUND OF THE INVENTION

1. Field of the Invention

This invention relates to an improved belt construction and to a method of making the same.

2. Prior Art Statement

It is known to provide a belt construction comprising a tension section, a compression section, a load-carrying section intermediate the tension section and the compression section, and a load supporting top section secured to the tension section and extending beyond opposed sides of the tension section, such belt construction being utilized as a lifting means for a bowling ball.

Such prior known belt construction has the top section formed of a material different than the material forming the tension section.

In addition, such prior known belt construction has a fabric covering means not only covering the tension, load-carrying and compression sections but also extending from the tension section against the bottom surface of the top section of the outer side edges thereof.

Such prior known belt construction has the top section thereof formed as a one-piece member.

SUMMARY OF THE INVENTION

It is one feature of this invention to provide an improved belt construction having a load supporting top section uniquely secured to the tension section thereof.

In particular, it was found, according to the teaching of this invention, that the load supporting top section of a belt construction could be formed of the same material as the tension section thereof and be homogeneously secured to the tension section.

In particular, one embodiment of this invention provides a belt construction comprising a tension section, a compression section, a load-carrying section intermediate the tension section and the compression section, and a load supporting top section secured to the tension section and extending beyond opposed sides of the tension section, the top section and the tension section being formed of the same material and being homogeneously secured together.

It was also found, according to the teachings of this invention, that a fabric covering means can be disposed on the tension, compression and load-carrying sections of such a belt construction with the fabric covering means being substantially U-shaped in cross section and with the free ends of the legs thereof being embedded in the top section to prevent such fabric covering means from delaminating from the belt construction.

For example, another embodiment of this invention provides a belt construction that comprises a tension section, a compression section, a load-carrying section intermediate the tension section and the compression section, a fabric covering means covering the exterior of the sections, and a load supporting top section secured to the tension section and extending beyond opposed sides of the tension section, the fabric covering means being substantially U-shaped in cross section and having the free ends of the legs thereof embedded in the top section.

It was also found, according to the teachings of this invention, that the top section of such a belt construction could have a tire cord reinforcing member disposed therein to tend to prevent the opposed side edges of the top section from bending toward a load imposed upon the medial portion of the top section as will be apparent hereinafter.

For example, another embodiment of this invention provides a belt construction that comprises a tension section, a compression section, a load-carrying section intermediate the tension section and the compression section, and a load supporting top section secured to the tension section and extending beyond the opposed sides of the tension section, the top section having opposed surfaces one of which has an intermediate portion thereof secured to the tension section and the other of which provides a load supporting surface for the belt construction. The top section has a tire cord reinforcing member disposed therein intermediate the opposed surfaces thereof.

Accordingly, it is an object of this invention to provide an improved belt construction having one or more of the novel features of this invention as set forth above or hereinafter shown or described.

Another object of this invention is to provide a method of making such a belt construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a fragmentary perspective and cross-sectional view of the improved belt construction of this invention.

FIG. 2 is a fragmentary cross-sectional view illustrating the belt construction of FIG. 1 being utilized as a bowling ball lift means, the bowling ball being shown in fragmentary elevation.

FIG. 3 is a fragmentary cross-sectional view illustrating a step in the method of this invention for forming the belt construction of FIG. 1.

FIG. 4 is a cross-sectional view illustrating another step in the method of this invention for forming the belt construction of FIG. 1.

FIG. 5 is a fragmentary cross-sectional view illustrating another step in the method of this invention for forming a belt construction of FIG. 1.

DESCRIPTION OF THE PREFERRED EMBODIMENT

While the various features of this invention are hereinafter described and illustrated as being particularly adapted to provide a belt construction for lifting a bowling ball or the like, it is to be understood that the various features of this invention can be utilized singly or in any combination thereof to provide a belt construction for other purposes as desired.

Therefore, this invention is not to be limited to only the embodiment illustrated in the drawings, because the drawings are merely utilized to illustrate one of the wide variety of uses of this invention.

Referring now to FIG. 1, the improved belt construction of this invention is generally indicated by the reference numeral 20 and has a substantially trapezoidal lower belt section that is generally indicated by the reference numeral 21 and comprises a tension section 22, a load-carrying section 23 and a compression section 24, the load-carrying section 23 being disposed intermediate the tension section 22 and compression section 24 and being formed of one or two cushion layers 25 with a cord means 26 helically wound between the cushioning layers 25 in a manner well known in the art.

The belt construction 20 also includes a load supporting top section, that is generally indicated by the reference numeral 27, and is secured to the tension section 22 of the lower belt section 21 in a unique manner hereinafter set forth, the top section 27 having opposed substantially parallel side edges 28 respectively extending beyond the opposed sides 29 of the tension section 22 as illustrated.

The sections 22, 23, 24 and 27 of the belt construction 20 are formed mainly from polymeric materials as will be apparent hereinafter and the belt construction 20 is continuous as will also be apparent hereinafter.

A fabric covering means 30 is secured against the exterior of the lower belt section 21 and is substantially U-shaped as defined by a cross member 31 that extends across the bottom 32 of the compression section 24 and a pair of upstanding legs 33 that extend along the opposed sides of the compression section 24, load-carrying section 23 and tension section 22 and terminate at free ends 34 thereof which are embedded into the top section 27 of the belt construction 20 in a manner hereinafter set forth so that the free ends 34 of the legs 33 of the U-shaped fabric covering means 30 are prevented from being delaminated from the belt construction 20 during the use thereof as will be apparent hereinafter.

The top section 27 of the belt construction 20 has a substantially quadrilateral cross-sectional configuration defined by the opposed side surfaces 28 and by opposed substantially parallel bottom and top surfaces 35 and 36, the top surface 36 being a load supporting surface for the belt construction 20.

For example, reference is now made to FIG. 2 wherein the belt construction 20 of this invention is being utilized as a bowling ball lift wherein the belt construction 20 is partially disposed around a rotatable pulley 37 that has a substantially trapezoidal-shaped groove 38 formed in the outer peripheral surface 39 thereof and which receives the lower belt section 21 of the belt construction 20 while the lower surface 35 of the top section 27 thereof rests on the outer peripheral surface 39 of the pulley 37. In this manner, rotation of the pulley 37 drives the belt construction 20 therewith, the top surface 36 of the belt construction 20 being utilized to carry a bowling ball 40 thereon to raise the same from the pit area of a bowling alley to the bowling ball return chute in a manner well known in the art.

It can be seen in FIG. 2 that the bowling ball 40 engages only the medial portion of the top section 27 of the belt construction 20 and imposes a heavy load thereon so that the opposed side edges 28 of the top section 27 of the belt construction 20 would tend to curl upwardly toward the ball 40.

However, the unique top section 27 of the belt construction 20 of this invention has a conventional tire cord reinforcing member 41 disposed therein intermediate the bottom and top surfaces 35 and 36 thereof and extending all the way to the side edges 28 thereof with the reinforcing cords of the tire cord member extending laterally between the side edges 28 to prevent such curling action of the side edges 28 towards the ball 40 during the loading of the same on the medial portion of the top surface 36 as illustrated in FIG. 2.

Accordingly, the top section 27 of the belt construction 20 is formed of two layers 42 and 43 of like material with the tire cord reinforcing member 41 disposed therebetween and formed in a manner hereinafter set forth.

The method of this invention for forming the improved belt construction 20 of this invention includes the steps of forming a "green core" that is generally indicated by the reference numeral 44 in FIG. 4 and comprises the tension section 22, load-carrying section 23, compression section 24 and fabric covering means 30 with the sections 22, 23 and 24 being in an uncured manner as is well known in the art for providing "green cores".

In particular, a plurality of green cores 44 of this invention can be formed in the manner illustrated in FIG. 3 wherein the layers of material 24, 23 and 22 are serially wrapped on a cylindrical mandrel in a manner well known in the art and are sufficiently secured together, without curing thereof, so that subsequently, suitable cutting or skiving knife means 45 can be utilized to cut the interconnected layers 22, 23 and 24 into the trapezoidal-shaped sections 21 in a manner well known in the art. Thereafter, each trapezoidal section 21 has the fabric covering means 30 secured thereto in a manner well known in the art whereby it can be seen in FIG. 4 that the upper free ends 34 of the legs 33 of the U-shaped covering means 30 are initially substantially coplanar with the top surface 46 of the tension section 22.

While the fabric covering means 30 of this invention can comprise any suitable material of one or more layers, the fabric covering means 30 illustrated in the drawings comprises two fabric layers 47 and 48 of stress-relieved fabric formed from cotton, nylon, etc., and are well known in the belt making art.

After a plurality of the green cores 44 have been provided in the manner illustrated in FIG. 4, the plurality of such green cores 44 are respectively placed in suitable grooves 49 formed in the peripheral surface 50 of a suitable cylindrical mandrel 51 wherein the top surfaces 46 of the tension sections 22 of the cores 44 initially extend above the surface 50 as represented by the dash lines 52' in FIG. 5.

Thereafter, the inner layer 42 of the top section 27 is disposed or wrapped on the mandrel 51 followed by the tire cord reinforcing member 41 thereon and then the outer layer 43 on the tire cord reinforcing member 41 as illustrated in FIG. 5 whereby the assembly of FIG. 5 is subsequently cured under heat and pressure in a manner well known in the belt making art. During such curing, the material of the cores 44 shrinks and compresses in a manner well known in the art of curing green cores so that in effect the lower surface 52 of the inner layer 42 of the top section 27 homogeneously joins with the tension sections 22 along lines represented by the reference numeral 53 which are below the free ends 34 of the covering means 30 of the cores 44 so that the free ends 34 of the covers 30 are embedded within the lower layer 42 of the top section 27 as illustrated.

As previously stated, the material of the layers 42, 43 and the tension sections 22 of the cores 44 are the same material so that while lines 53 are illustrated in FIG. 5 and different directional cross-hatching is illustrated in FIGS. 1 and 2 to represent the tension section 22 and the lower layer 42 of the top section 27, it is to be understood that in the finished product there is no physical or visible division line 53 between the tension section 22 and the lower layer 42 of the top section 27 as the same are homogeneously secured together during the aforementioned curing operation.

After the assembly of FIG. 5 has been cured to bond together all of the layers, cords and fabric in a manner well known in the art, the individual continuous belts 20 can be formed by appropriately cutting through the layers 41, 42, 43 intermediate the cores 44 to produce the side edges 28 of each belt construction 20 as illustrated in FIG. 1 and with each belt construction of the desired width.

While it is believed that any suitable material can be provided for the top section 27 and tension section 22 of the belt construction 20 of the invention, one such belt construction 20 being made according to the teachings of this invention has the material of the layers 42 and 43 of the top section 27 and the tension section 22 formed mainly from neoprene and for every 100 units or parts by weight of neoprene, approximately 25 to 75 units or parts by weight of silicon dioxide, titanium dioxide and calcium carbonate are blended therewith together with approximately 5 to 20 units or parts by weight of cure plasticizers and processing colorant. Such materials are blended together with suitable reinforcing cotton fibers in a manner well known to the art. While the colorant can be any suitable colorant, such produced belt construction 20 has a blue coloring.

The load-carrying section 23 is formed of neoprene cushions and the compression section 24 is also formed of neoprene having suitable reinforcing fibers disposed therein in a manner well known in the belt making art.

As previously stated the tire cord reinforcing member 41 is substantially of the same structure utilized as a reinforcing belt for automobile tires and is formed of polymeric material, such as a polyester, and has the cords thereof extending laterally, i.e., from side edge 28 to side edge 28 of the top section 27 rather than longitudinally thereof so as to tend to prevent the aforementioned curling up of the side edges 28 under the heavy load being placed on the medial portion of the top surface 36 thereof.

When the green cores 44 are cut from the assembly illustrated in FIG. 3, it can be seen that the green cores 44 have a truly trapezoidal configuration. However, the grooves 49 in the mandrel 51 illustrated in FIG. 5 while generally trapezoidal in cross-sectional configuration thereof have upper ends 54 which are substantially parallel to each other to cause the upper portions 55 of the fabric covering 30 to the free ends 34 thereof to be deformed substantially parallel to each other and the same remain substantially parallel to each other after the final curing operation. While this feature insures that the free ends 34 of the covering means 30 will be fully embedded into the lower layer 42 of the top section 27, it is to be understood that such portions 55 of the fabric covering 30 could be truly trapezoidal without being straightened, if desired.

Therefore, it can be seen that this invention not only provides an improved belt construction, but also this invention provides a method of making such a belt construction.

While the form and method of this invention now preferred have been illustrated and described as required by the Patent Statute, it is to be understood that other forms and method steps can be utilized and still fall within the scope of the appended claims.

What is claimed is:

1. In a belt construction comprising a tension section having opposed sides and a top surface, a compression section, a load-carrying section intermediate said tension section and said compression section, a fabric covering means covering the exterior of said sections, and a load supporting top section secured to said top surface of said tension section and extending beyond said opposed sides of said tension section, the improvement wherein said fabric covering means is substantially U-shaped in cross section and has the free ends of the legs thereof extending beyond said top surface of said tension section in respective directions substantially the same as said opposed sides of said tension section and being fully embedded in said top section to tend to prevent said free ends from being delaminated form said belt construction.

2. A belt construction as set forth in claim 1 wherein said tension section, load-carrying section and compression section generally define a trapezoidal cross-sectional configuration.

3. A belt construction as set forth in claim 2 wherein said top section generally defines a quadrilateral cross-sectional configuration.

4. A belt construction as set forth in claim 3 wherein a fabric covering means covers the exterior of said trapezoidal configuration, is substantially U-shaped in cross section, and has free ends of the legs thereof embedded in said top section, said top section having opposed surfaces one of which has an intermediate portion thereof secured to said tension section and the other of which provides a load supporting surface for said belt construction, said top section having a tire cord reinforcing member disposed intermediate said opposed surfaces thereof.

5. A belt construction as set forth in claim 1 wherein said fabric covering means comprises a stress relieved fabric covering means.

6. A belt construction as set forth in claim 5 wherein said fabric covering means comprises a plurality of fabric layers.

7. A belt construction as set forth in claim 1 wherein said top section and said tension section are formed of the same material and are homogeneously secured together.

8. A belt construction as set forth in claim 1 wherein said fabric covering means comprises a plurality of fabric layers.

9. A belt construction as set forth in claim 1 wherein said top section has a tire cord reinforcing member disposed intermediate said opposed surfaces thereof.

10. A belt construction as set forth in claim 9 wherein said top section has opposed side edges, said tire cord reinforcing member extending to said opposed side edges.

11. A belt construction as set forth in claim 10 wherein said top section comprises two layers of like material with said tire cord reinforcing member being disposed between said layers.

12. A belt construction as set forth in claim 7 wherein said opposed sides of said tension section are substantially parallel to each other.

* * * * *